(12) United States Patent
Misawa

(10) Patent No.: US 10,020,688 B2
(45) Date of Patent: Jul. 10, 2018

(54) CONTACTLESS POWER TRANSMISSION DEVICE AND POWER TRANSFER SYSTEM

(71) Applicant: TOYOTA JIDOSHA KABUSHIKI KAISHA, Toyota-shi, Aichi-ken (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 15/177,003

(22) Filed: Jun. 8, 2016

(65) Prior Publication Data

US 2017/0018966 A1 Jan. 19, 2017

(30) Foreign Application Priority Data

Jul. 17, 2015 (JP) .................................. 2015-143058

(51) Int. Cl.
*H02J 50/12* (2016.01)
*H02J 50/10* (2016.01)
*H02M 7/5387* (2007.01)

(52) U.S. Cl.
CPC ......... *H02J 50/12* (2016.02); *H02M 7/53871* (2013.01)

(58) Field of Classification Search
None
See application file for complete search history.

(56) References Cited

U.S. PATENT DOCUMENTS

| 4,445,167 A * | 4/1984 | Okado ............. H02M 7/53875 318/811 |
| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0251929 A1* | 10/2009 | Choi ...................... H02M 1/08 363/21.02 |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |

(Continued)

FOREIGN PATENT DOCUMENTS

| AU | 2006269374 B2 | 10/2009 |
| AU | 2007349874 A2 | 1/2010 |

(Continued)

*Primary Examiner* — Jared Fureman
*Assistant Examiner* — James Evans
(74) *Attorney, Agent, or Firm* — Oliff PLC

(57) ABSTRACT

A power supply ECU executes turn-on current control for controlling a turn-on current It to a target value Itr by adjusting a drive frequency f, turn-on current It indicating an output current Io of an inverter at a rising of an output voltage Vo of the inverter. Target value Itr is set to fall within a range where a recovery current is not produced in the inverter. In the turn-on current control, when a startup frequency indicating drive frequency f at a startup of the inverter is fa0, the control unit adjusts drive frequency f to be more than or equal to fa0. When turn-on current It is larger than target value Itr, the control unit adjusts drive frequency f in the direction toward startup frequency fa0.

6 Claims, 12 Drawing Sheets

(56) References Cited

U.S. PATENT DOCUMENTS

| | | |
|---|---|---|
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0148590 A1* | 6/2010 | Kojima ............. H02M 7/53871 307/104 |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0127846 A1* | 6/2011 | Urano ..................... H02J 17/00 307/104 |
| 2012/0001494 A1* | 1/2012 | Urano ..................... H02J 50/12 307/104 |
| 2013/0127409 A1 | 5/2013 | Ichikawa |
| 2013/0193749 A1 | 8/2013 | Nakamura et al. |
| 2013/0334884 A1* | 12/2013 | Arisawa ................ H02M 3/158 307/43 |
| 2014/0247000 A1* | 9/2014 | Schoenknecht ......... H02M 1/08 318/400.27 |
| 2016/0344236 A1 | 11/2016 | Misawa |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-207795 A | 10/2014 |
| JP | 2016-220421 A | 12/2016 |
| KR | 2008-0031398 A | 4/2008 |
| KR | 2010-0015954 A | 2/2010 |
| WO | 2007/008646 A1 | 1/2007 |
| WO | 2008/118178 A1 | 10/2008 |
| WO | 2013/108108 A2 | 7/2013 |

* cited by examiner

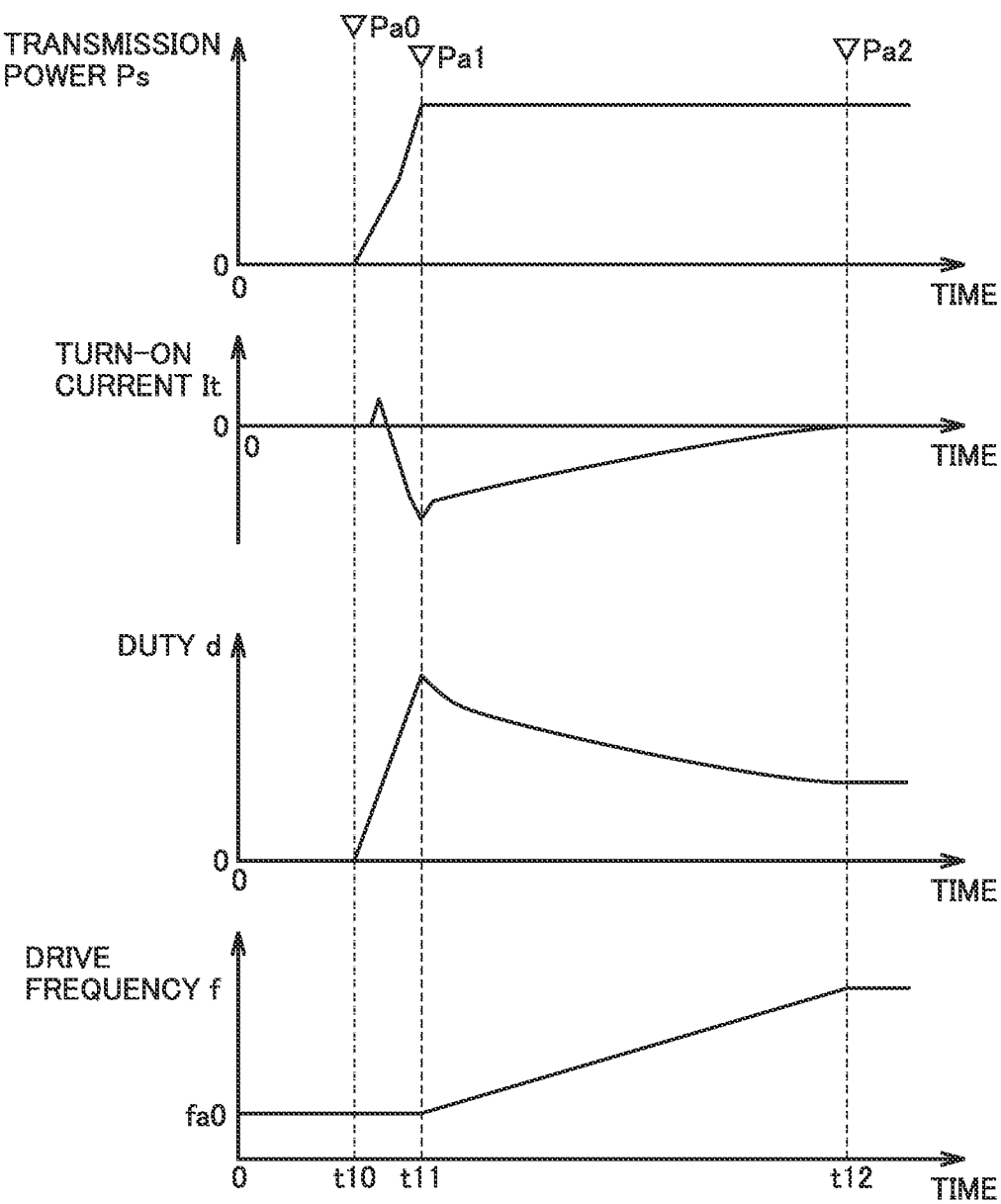

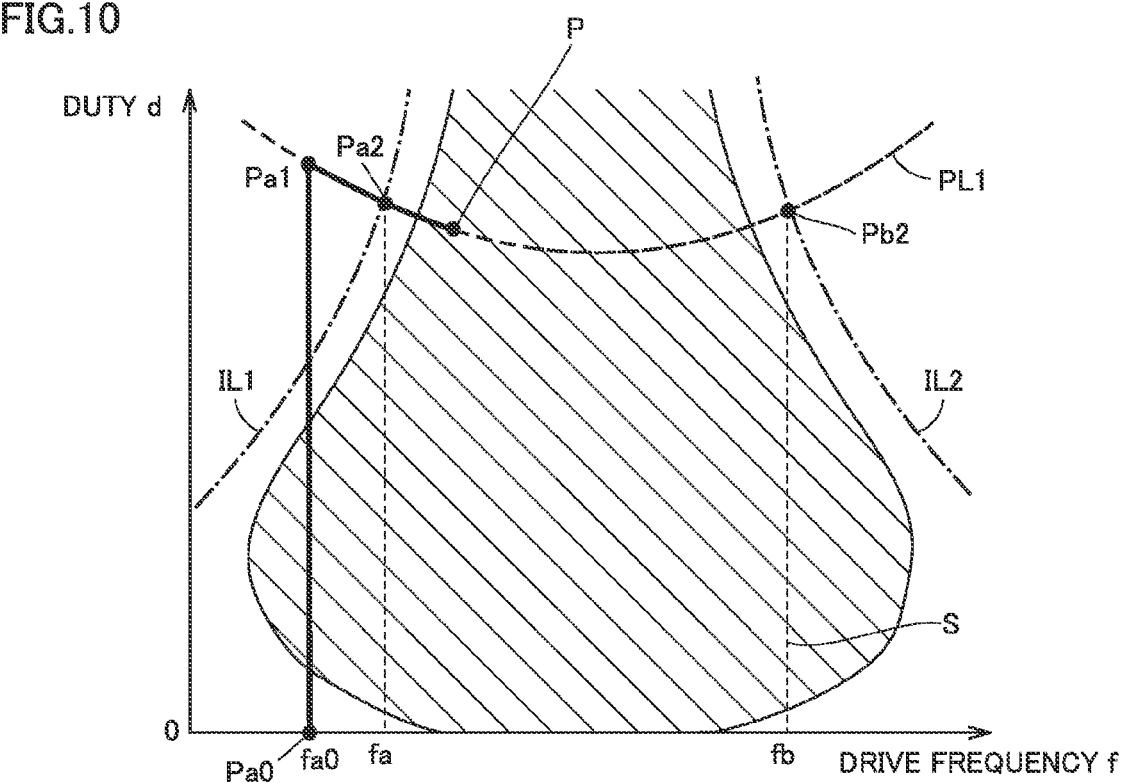

CONTACTLESS POWER TRANSMISSION DEVICE AND POWER TRANSFER SYSTEM

This nonprovisional application is based on Japanese Patent Application No. 2015-143058 filed on Jul. 17, 2015 with the Japan Patent Office, the entire contents of which are hereby incorporated by reference.

BACKGROUND OF THE INVENTION

Field of the Invention

The present invention relates to a contactless power transmission device and a power transfer system, and more particularly to a power control technique in a contactless power transmission device that transmits electric power to a power reception device in a contactless manner.

Description of the Background Art

Japanese Patent Laying-Open No. 2014-207795 discloses a contactless power feeding system that supplies electric power from a power feeding device (power transmission device) to a vehicle (power reception device) in a contactless manner. In this contactless power feeding system, the power feeding device includes a power transmission coil, an inverter and a control unit. The power transmission coil transmits electric power to the power reception coil mounted on the vehicle in a contactless manner. The inverter produces an AC current in accordance with a drive frequency for output to the power transmission coil. The control unit obtains a charging power command for a battery and output power for the battery from the vehicle side, and controls by feedback the drive frequency of the inverter such that the output power follows the charging power command. Japanese Patent Laying-Open Nos. 2013-154815, 2013-146154, 2013-146148, 2013-110822, and 2013-126327 also disclose techniques about contactless power transmission.

SUMMARY OF THE INVENTION

When the inverter is a voltage-source inverter and supplies transmission power in accordance with the drive frequency to the power transmission unit, transmission power can be controlled by adjusting the duty of an inverter output voltage. By controlling the drive frequency of the inverter, a turn-on current indicating an inverter output current at the rising of the inverter output voltage can be controlled.

It is known that in the voltage-source inverter, if an output current of the same sign as the output voltage (i.e., positive turn-on current) flows at the rising of the output voltage, a recovery current flows into freewheel diodes of the inverter. When a recovery current flows, the freewheel diodes generate heat, resulting in increase in losses. Therefore, by adjusting the drive frequency of the inverter, the turn-on current is controlled to a target value (a value less than or equal to 0). Accordingly, losses caused by the recovery current can be suppressed.

In executing control as described above, a situation in which the turn-on current exceeds the target value and a positive turn-on current flows may occur. In such a case, it is desirable to promptly return the operating state of the inverter to the state where a positive turn-on current does not flow, thereby promptly reducing a recovery current.

The present invention was made to solve the above-described problem, and has an object to provide a contactless power transmission device that transmits electric power to a power reception device in a contactless manner, in which a recovery current is reduced promptly when a turn-on current is larger than a target value.

The present invention has another object to provide a power transfer system that transmits electric power from a power transmission device to a power reception device in a contactless manner, in which a recovery current is reduced promptly when a turn-on current is larger than a target value.

A contactless power transmission device according to an aspect of the present invention includes a power transmission unit configured to transmit electric power to a power reception device in a contactless manner, a voltage-source inverter configured to supply transmission power in accordance with a drive frequency to the power transmission unit, and a control unit configured to control the inverter. The control unit executes turn-on current control for controlling a turn-on current by adjusting the drive frequency, the turn-on current indicating an output current of the inverter at a rising of an output voltage of the inverter. In the turn-on current control, when a startup frequency indicating the drive frequency at a startup of the inverter is a first frequency, the control unit adjusts the drive frequency to be more than or equal to the first frequency, and when the startup frequency is a second frequency which is higher than the first frequency, the control unit adjusts the drive frequency to be less than or equal to the second frequency. When the turn-on current is larger than a predetermined limit value, the control unit adjusts the drive frequency in a direction toward the startup frequency.

A power transfer system according to another aspect of the present invention includes a power transmission device and a power reception device. The power transmission device includes a power transmission unit configured to transmit electric power to the power reception device in a contactless manner, a voltage-source inverter configured to supply transmission power in accordance with a drive frequency to the power transmission unit, and a control unit configured to control the inverter. The control unit executes turn-on current control for controlling a turn-on current by adjusting the drive frequency, the turn-on current indicating an output current of the inverter at a rising of an output voltage of the inverter. In the turn-on current control, when a startup frequency indicating the drive frequency at a startup of the inverter is a first frequency, the control unit adjusts the drive frequency to be more than or equal to the first frequency, and when the startup frequency is a second frequency which is higher than the first frequency, the control unit adjusts the drive frequency to be less than or equal to the second frequency. When the turn-on current is larger than a predetermined limit value, the control unit adjusts the drive frequency in a direction toward the startup frequency.

Preferably, when the drive frequency is more than or equal to the first frequency and when the turn-on current is larger than the limit value, the control unit decreases the drive frequency, and when the drive frequency is less than or equal to the second frequency and when the turn-on current is larger than the limit value, the control unit increases the drive frequency.

With the above-described configuration, when the turn-on current is larger than the limit value, the turn-on current control is executed such that a turn-on current decreases. Techniques for adjusting the drive frequency for achieving such turn-on current control include a technique for increasing the drive frequency and a technique for decreasing the drive frequency, in other words, a technique for adjusting the drive frequency in the direction toward the startup frequency and a technique for adjusting the drive frequency in the direction away from the startup frequency. As will be described later in detail, when the turn-on current is larger than the limit value, the adjustment of the drive frequency toward the startup frequency is more likely to cause the operating state of the inverter to promptly return to the state where a positive turn-on current does not flow than the adjustment of the drive frequency in the direction away from the startup frequency. Therefore, by thus adjusting the drive frequency, the recovery current can be promptly reduced.

Preferably, an adjustment amount of the drive frequency adjusted by the control unit when the turn-on current is larger than the limit value is larger than an adjustment amount of the drive frequency adjusted by the control unit when the turn-on current is smaller than the limit value.

Since the above-described configuration shortens the time required to cause the operating state of the inverter to promptly return to the state where a positive turn-on current does not flow, the recovery current can be reduced further.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an explanatory time chart of transmission power control and turn-on current control.

FIG. 10 is an explanatory drawing of a second situation in which an operating point of the inverter is included in the forbidden band.

DESCRIPTION OF THE PREFERRED EMBODIMENTS

Figure 1:
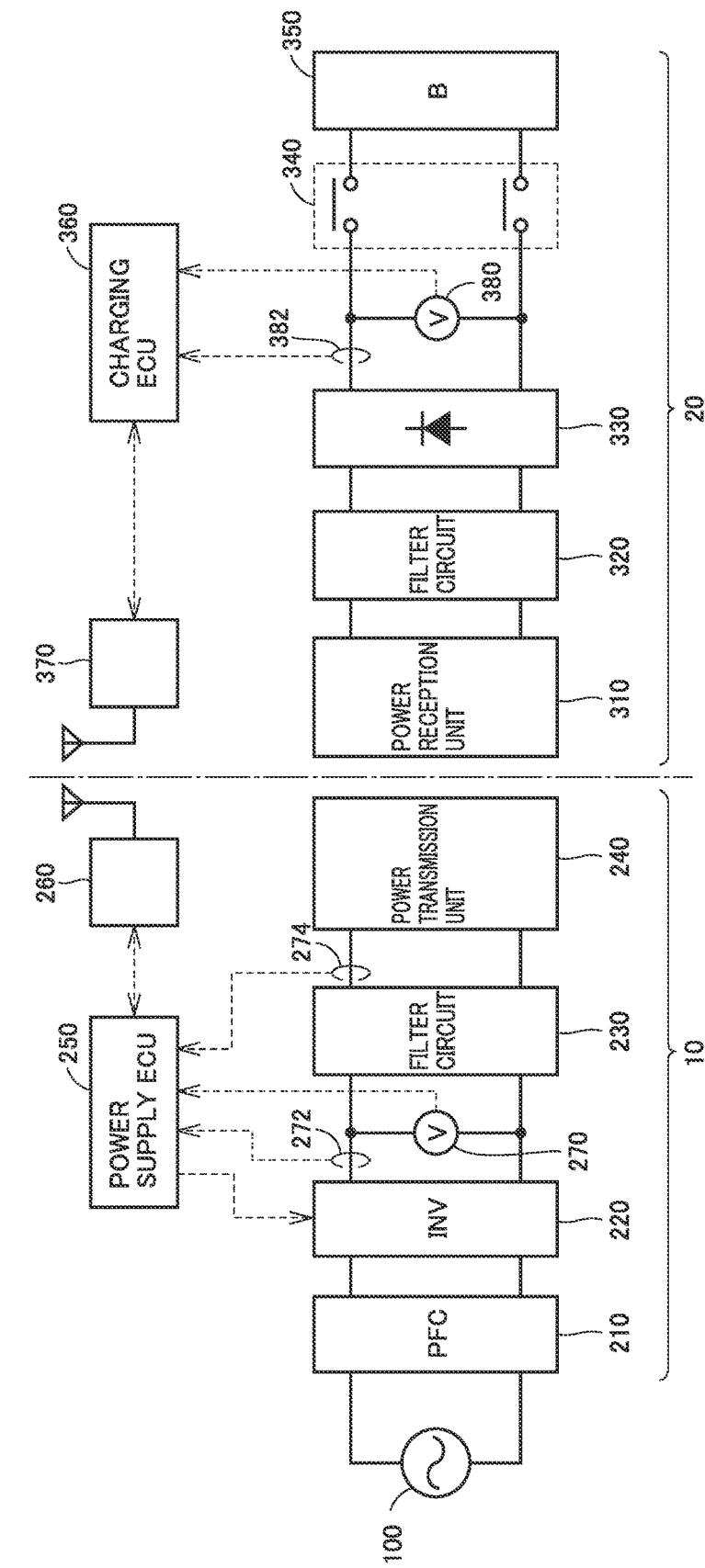
FIG. 1 shows an overall configuration of a power transfer system to which a contactless power transmission device according to an embodiment of the present invention is applied.

Hereinafter, an embodiment of the present invention will be described in detail with reference to the drawings. In the drawings, the same or corresponding portions have the same reference characters allotted, and description thereof will not be repeated.

FIG. 1 is an overall configuration of a power transfer system to which a contactless power transmission device according to an embodiment of the present invention is applied. Referring to FIG. 1, a power transfer system 1 includes a power transmission device 10 and a power reception device 20. Power reception device 20 may be mounted on a vehicle or the like that can travel using electric power supplied from power transmission device 10 and stored therein, for example.

Power transmission device 10 includes a power factor correction (PFC) circuit 210, an inverter 220, a filter circuit 230, and a power transmission unit 240. Power transmission device 10 further includes a power supply ECU (Electronic Control Unit) 250, a communication unit 260, a voltage sensor 270, and current sensors 272, 274.

PFC circuit 210 can rectify and boost AC power received from an AC power supply 100 (e.g., system power supply) for supply to inverter 220 and can bring an input current close to a sine wave, thereby correcting the power factor. Any of publicly known various PFC circuits can be adopted as PFC circuit 210. Instead of PFC circuit 210, a rectifier without the power factor correcting function may be adopted.

Inverter 220 converts DC power received from PFC circuit 210 into transmission power (AC power) having a predetermined transmission frequency. The transmission power produced by inverter 220 is supplied to power transmission unit 240 through filter circuit 230. Inverter 220 is a voltage-source inverter, in which a freewheel diode is connected in antiparallel to each of switching elements that constitute inverter 220 (see FIG. 3). Inverter 220 is implemented by a single-phase full bridge circuit, for example.

Filter circuit 230 is provided between inverter 220 and power transmission unit 240, and suppresses a harmonic noise caused by inverter 220. Filter circuit 230 is implemented by an LC filter including an inductor and a capacitor, for example.

Power transmission unit 240 receives AC power (transmission power) having a transmission frequency from inverter 220 through filter circuit 230, and transmits the electric power in a contactless manner to a power reception unit 310 of power reception device 20 through an electromagnetic field produced around power transmission unit 240. Power transmission unit 240 includes a resonant circuit for transmitting electric power to power reception unit 310 in a contactless manner, for example. Although the resonant circuit may be composed of a coil and a capacitor, the capacitor may be omitted when a desired resonant state is achieved only with the coil.

Voltage sensor 270 detects an output voltage of inverter 220, and outputs a detected value to power supply ECU 250. Current sensor 272 detects an output current of inverter 220, and outputs a detected value to power supply ECU 250. Based on the detected values of voltage sensor 270 and current sensor 272, transmission power supplied from inverter 220 to power transmission unit 240 (i.e., electric power output from power transmission unit 240 to power reception device 20) can be detected. Current sensor 274 detects a current flowing in power transmission unit 240, and outputs a detected value to power supply ECU 250.

Power supply ECU 250, including a CPU (Central Processing Unit), a memory device, an input/output buffer, and the like (neither shown), receives signals from various sensors and devices, and controls various devices in power transmission device 10. As an example, power supply ECU 250 exerts switching control of inverter 220 such that inverter 220 produces transmission power (AC power) when power transmission from power transmission device 10 to power reception device 20 is executed. Various types of controls are not limited to processing by software, but can also be processed by dedicated hardware (an electronic circuit).

As main control executed by power supply ECU 250, power supply ECU 250 executes feedback control (hereinafter also referred to as "transmission power control") for controlling transmission power to target power when power transmission from power transmission device 10 to power reception device 20 is executed. Specifically, power supply ECU 250 controls transmission power to target power by adjusting the duty of an output voltage of inverter 220. The duty of an output voltage is defined as a ratio of a positive (or negative) voltage output time period to the cycle of an output voltage waveform (square wave). The duty of an inverter output voltage can be adjusted by changing the operating timing of the switching elements of inverter 220. Target power may be produced based on the power reception state of power reception device 20, for example. In the present embodiment, power reception device 20 produces target power for transmission power based on a difference between a target value and a detected value of received power, and transmits the target power to power transmission device 10.

Power supply ECU 250 executes feedback control for controlling a turn-on current in inverter 220 to a target value (hereinafter also referred to as "turn-on current control") while executing the above-described transmission power control. The turn-on current is an instantaneous value of the output current of inverter 220 at the rising of the output voltage of inverter 220. If the turn-on current has a positive value, a reverse recovery current flows into the freewheel diodes of inverter 220, causing heat (i.e., losses) to be generated in the freewheel diodes. Therefore, the above-described target value for the turn-on current control (turn-on current target value) is set to fall within the range where a recovery current is not produced in the freewheel diodes of inverter 220, and is basically set at a predetermined value of less than or equal to 0. As the turn-on current target value, "0" at which the power factor is improved is ideal, but a negative value may also be selected affording a margin. The turn-on current target value may be set at a positive value which is small to such a degree that losses caused by a recovery current are negligible. The transmission power control and turn-on current control will be described later in detail.

Communication unit 260 is configured to make wireless communications with a communication unit 370 of power reception device 20, and receives a target value for transmission power (target power) transmitted from power reception device 20, and also exchanges information including start/stop of power transmission, the power reception state of power reception device 20, and the like with power reception device 20.

On the other hand, power reception device 20 includes power reception unit 310, a filter circuit 320, a rectification unit 330, a relay circuit 340, and a power storage device 350. Power reception device 20 further includes a charging ECU 360, communication unit 370, a voltage sensor 380, and a current sensor 382.

Power reception unit 310 receives electric power (AC power) output from power transmission unit 240 of power transmission device 10 in a contactless manner. Power reception unit 310 includes a resonant circuit for receiving electric power from power transmission unit 240 in a contactless manner, for example. Although the resonant circuit may be composed of a coil and a capacitor, the capacitor may be omitted when a desired resonant state is achieved only with the coil. Power reception unit 310 outputs received power to rectification unit 330 through filter circuit 320.

Filter circuit 320 is provided between power reception unit 310 and rectification unit 330, and suppresses a harmonic noise produced at the time of power reception. Filter circuit 320 is implemented by an LC filter including an inductor and a capacitor, for example. Rectification unit 330 rectifies AC power received by power reception unit 310 for output to power storage device 350.

Power storage device 350 is a rechargeable DC power supply, and is implemented to include a secondary battery, such as a lithium-ion battery or a nickel-metal hydride battery, for example. Power storage device 350 stores electric power output from rectification unit 330. Power storage device 350 then supplies stored electric power to a load driving device not shown. A large-capacity capacitor can also be adopted as power storage device 350.

Relay circuit 340 is provided between rectification unit 330 and power storage device 350, and is turned on when power storage device 350 is charged by power transmission device 10. Although not shown, a DC/DC converter that adjusts an output voltage of rectification unit 330 may be provided between rectification unit 330 and power storage device 350 (e.g., between rectification unit 330 and relay circuit 340).

Voltage sensor 380 detects an output voltage (a voltage of received power) of rectification unit 330, and outputs the detected value to charging ECU 360. Current sensor 382 detects an output current (a current of received power) from rectification unit 330, and outputs the detected value to charging ECU 360. Based on the detected values of voltage sensor 380 and current sensor 382, electric power received by power reception unit 310 (i.e., charging power for power storage device 350) can be detected. Voltage sensor 380 and current sensor 382 may be provided between power reception unit 310 and rectification unit 330 (e.g., between filter circuit 320 and rectification unit 330).

Charging ECU 360, including a CPU, a memory device, an input/output buffer, and the like (neither shown), receives signals from various sensors and devices, and controls various devices in power reception device 20. Various types of controls are not limited to processing by software, but may be processed by dedicated hardware (an electronic circuit).

As main control executed by charging ECU 360, during power reception from power transmission device 10, charging ECU 360 produces a target value for transmission power (target power) in power transmission device 10 such that received power in power reception device 20 attains a desired target value. Specifically, charging ECU 360 produces the target value for transmission power in power transmission device 10 based on the difference between the detected value and the target value for received power. Charging ECU 360 then transmits the produced target value for transmission power (target power) to power transmission device 10 through communication unit 370.

Communication unit 370 is configured to make wireless communications with communication unit 260 of power transmission device 10, and transmits the target value for transmission power (target power) produced in charging ECU 360 to power transmission device 10, exchanges information on start/stop of power transmission with power transmission device 10, and transmits the power reception state of power reception device 20 (a voltage of received power, a current of received power, received power, and the like) to power transmission device 10.

Figure 2:
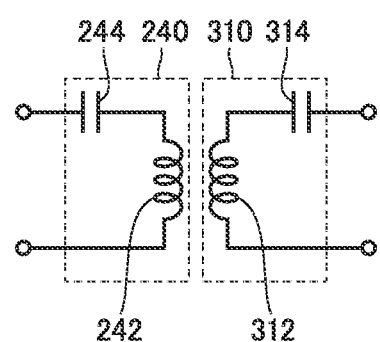
FIG. 2 illustrates an example of a circuit configuration of a power transmission unit and a power reception unit shown in FIG. 1.

FIG. 2 illustrates an example of a circuit configuration of power transmission unit 240 and power reception unit 310 shown in FIG. 1. Referring to FIG. 2, power transmission unit 240 includes a coil 242 and a capacitor 244. Capacitor 244 is provided to compensate for the power factor of transmission power, and is connected in series with coil 242. Power reception unit 310 includes a coil 312 and a capacitor 314. Capacitor 314 is provided to compensate for the power factor of received power, and is connected in series with coil 312. Such a circuit configuration is also called an SS (primary series-secondary series) arrangement.

Although not shown, the configuration of power transmission unit 240 and power reception unit 310 is not limited to that of the SS arrangement. For example, an SP (primary series-secondary parallel) arrangement with which capacitor 314 is connected in parallel with coil 312 in power reception unit 310 may be adopted, or a PP (primary parallel-secondary parallel) arrangement with which capacitor 244 is connected in parallel with coil 242 in power transmission unit 240 may be adopted.

Referring again to FIG. 1, in power transfer system 1, transmission power (AC power) is supplied from inverter 220 to power transmission unit 240 through filter circuit 230. Power transmission unit 240 and power reception unit 310 each include a coil and a capacitor, and are designed to resonate at a transmission frequency. The Q factor indicating the resonance strength of power transmission unit 240 and power reception unit 310 is preferably more than or equal to 100.

In power transmission device 10, when transmission power is supplied from inverter 220 to power transmission unit 240, energy (electric power) is transferred from power transmission unit 240 to power reception unit 310 through an electromagnetic field formed between the coil of power transmission unit 240 and the coil of power reception unit 310. The energy transferred to power reception unit 310 is supplied to power storage device 350 through filter circuit 320 and rectification unit 330.

Figure 3:
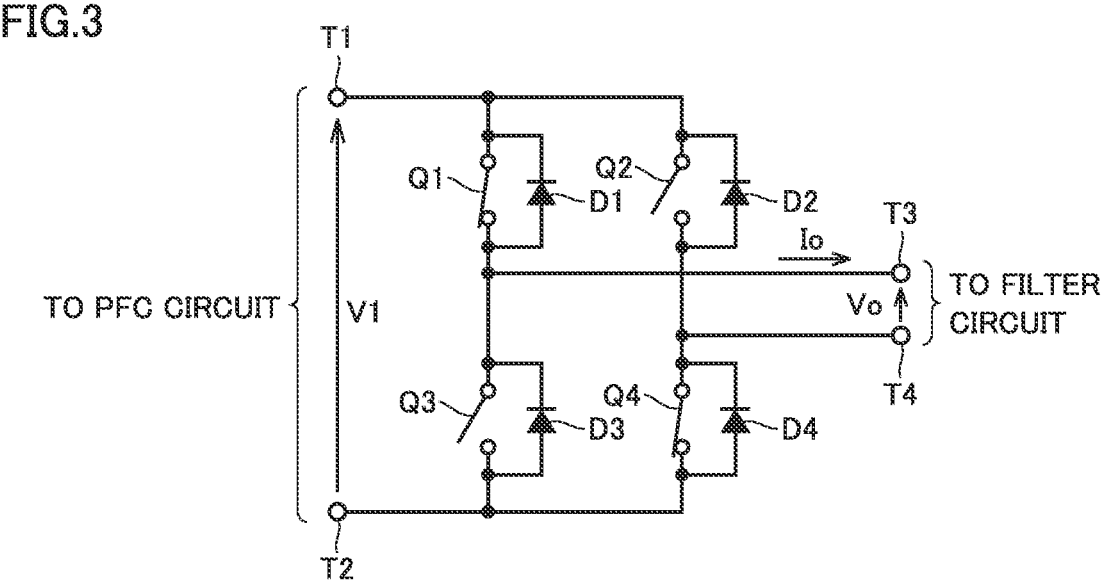
FIG. 3 illustrates a circuit configuration of an inverter shown in FIG. 1.

FIG. 3 illustrates a circuit configuration of inverter 220 shown in FIG. 1. Referring to FIG. 3, inverter 220 is a voltage-source inverter, and includes power semiconductor switching elements Q1 to Q4 (hereinafter briefly referred to as "switching elements" as well) and freewheel diodes D1 to D4. PFC circuit 210 (see FIG. 1) is connected to terminals T1 and T2 on the DC side, and filter circuit 230 is connected to terminals T3 and T4 on the AC side.

Switching elements Q1 to Q4 are implemented by, for example, IGBTs (Insulated Gate Bipolar Transistors), bipolar transistors, MOSFETs (Metal Oxide Semiconductor Field Effect Transistors), GTOs (Gate Turn Off thyristors), or the like. Freewheel diodes D1 to D4 are connected in antiparallel to switching elements Q1 to Q4, respectively.

A DC voltage V1 output from PFC circuit 210 is applied across terminal T1 and T2. Following the switching operation of switching elements Q1 to Q4, an output voltage Vo and an output current To are produced across terminals T3 and T4 (the direction indicated by each arrow in the figure shall indicate a positive value). This FIG. 3 shows, as an example, a state where switching elements Q1 and Q4 are on, and switching elements Q2 and Q3 are off. Output voltage Vo in this case is substantially equal to voltage V1 (positive value).

Figure 4:
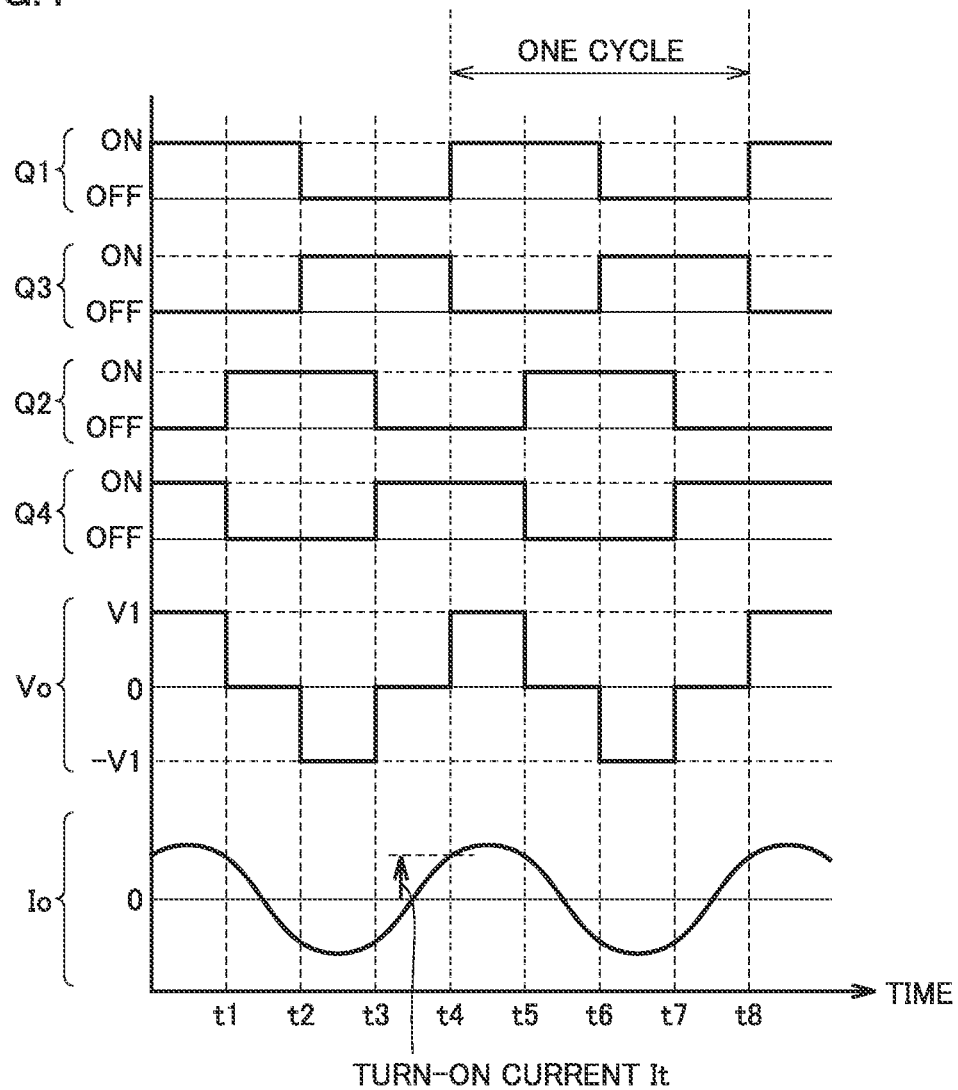
FIG. 4 illustrates switching waveforms of the inverter as well as waveforms of an output voltage and an output current.

FIG. 4 illustrates switching waveforms of inverter 220 as well as waveforms of output voltage Vo and output current Io. Referring to FIGS. 3 and 4, one cycle from time t4 to time t8 will be described by way of example.

At time t4, with switching elements Q2 and Q4 being off and on, respectively, switching element Q1 is switched from off to on, and switching element Q3 is switched from on to off (the state shown in FIG. 3). Then, output voltage Vo of inverter 220 rises from 0 to V1 (positive value).

At time t5, with switching elements Q1 and Q3 being on and off, respectively, switching element Q2 is switched from off to on, and switching element Q4 is switched from on to off. Then, output voltage Vo becomes 0.

At time t6, with switching elements Q2 and Q4 being on and off, respectively, switching element Q1 is switched from on to off, and switching element Q3 is switched from off to on. Then, output voltage Vo becomes −V1 (negative value).

At time t7, with switching elements Q1 and Q3 being off and on, respectively, switching element Q2 is switched from on to off, and switching element Q4 is switched from off to on. Then, output voltage Vo recovers to 0.

At time t8 after one cycle from time t4, with switching elements Q2 and Q4 being off and on, respectively, switching element Q1 is switched from off to on, and switching element Q3 is switched from on to off. Then, output voltage Vo rises from 0 to V1 (positive value) (the state identical to that of time t4).

The duty of output voltage Vo can be varied by changing the switching timing of switching elements Q1, Q3 and that of switching elements Q2 and Q4. FIG. 4 shows the case where the duty of output voltage Vo is 0.25. For example, when the switching timing of switching elements Q2 and Q4 is accelerated relative to the state shown in FIG. 4, the duty of output voltage Vo can be made lower than 0.25 (0 at minimum), and when the switching timing of switching elements Q2 and Q4 is delayed, the duty of output voltage Vo can be made higher than 0.25 (0.5 at maximum).

Transmission power can be varied by adjusting the duty of output voltage Vo. Qualitatively, transmission power can be increased by increasing the duty, and can be reduced by decreasing the duty. Therefore, power supply ECU 250 executes transmission power control for controlling transmission power to target power by adjusting the duty of output voltage Vo.

An instantaneous value It of output current Io at the rising of output voltage Vo (time t4 and time t8) is equivalent to above-described turn-on current It. The value of turn-on current It varies in accordance with voltage V1 supplied to inverter 220 from PFC circuit 210 and the drive frequency (switching frequency) of inverter 220. FIG. 4 shows the case where positive turn-on current It flows.

When positive turn-on current It flows, a reverse current (i.e., a recovery current) flows into freewheel diode D3 (see FIG. 3) connected in antiparallel to switching element Q3. When the recovery current flows into freewheel diode D3, heat generation in freewheel diode D3 increases, causing increase in losses in inverter 220. If turn-on current It is less than or equal to 0, a recovery current does not flow into freewheel diode D3, which suppresses losses in inverter 220.

Since turn-on current It varies when the drive frequency of inverter 220 varies, turn-on current It may be controlled by adjusting the drive frequency of inverter 220. Therefore, power supply ECU 250 executes the turn-on current control for controlling turn-on current It to a target value by adjusting the drive frequency of inverter 220. The target value for turn-on current It is basically set at a value of less than or equal to 0 such that a recovery current is not produced in inverter 220.

Figure 5:
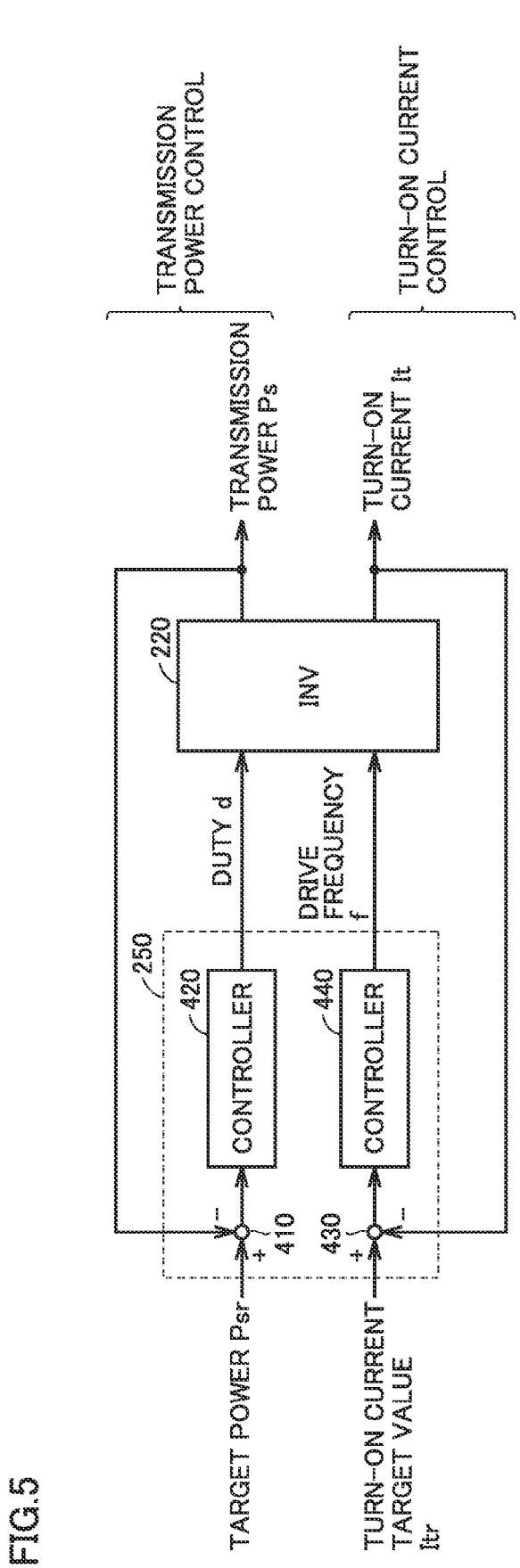
FIG. 5 is a control block diagram of transmission power control and turn-on current control executed by a power supply ECU.

FIG. 5 is a control block diagram of transmission power control and turn-on current control executed by power supply ECU 250. Referring to FIG. 5, power supply ECU 250 includes subtraction units 410, 430 and controllers 420, 440. A feedback loop formed by subtraction unit 410, controller 420 and inverter 220 of a control target implements the transmission power control. On the other hand, a feedback loop formed by subtraction unit 430, controller 440 and inverter 220 implements the turn-on current control.

Subtraction unit 410 subtracts a detected value of transmission power Ps from target power Psr indicating the target value for transmission power, and outputs a calculated value to controller 420. The detected value of transmission power Ps can be calculated based on the detected values of voltage sensor 270 and current sensor 272 shown in FIG. 1, for example.

Controller 420 adjusts a duty d of output voltage Vo of inverter 220 based on the calculated value received from subtraction unit 410. The transmission power control is thereby achieved.

In more detail, if the calculated value is approximately 0 (where transmission power Ps is almost equal to target power Psr), controller 420 maintains duty d at that time. If the calculated value is a positive value (where transmission power Ps is smaller than target power Psr), controller 420 increases duty d by a predetermined adjustment amount Δd. On the other hand, if the calculated value is a negative value (where transmission power Ps is larger than target power Psr), controller 420 decreases duty d by predetermined adjustment amount Δd. Duty d is thereby adjusted such that transmission power Ps approaches target power Psr, and transmission power Ps is controlled to target power Psr. Controller 420 may execute PI control (Proportional-Integral Control) using the difference between target power Psr and transmission power Ps as an input.

Subtraction unit 430 subtracts a detected value of turn-on current It from a turn-on current target value Itr, and outputs a calculated value to controller 440. Turn-on current target value Itr is basically set at a value of less than or equal to 0 as described above. The detected value of turn-on current It is a detected value (instantaneous value) of current sensor 272 at the time when the rising of output voltage Vo is detected by voltage sensor 270 (see FIG. 1).

Controller 440 adjusts drive frequency f of inverter 220 based on the calculated value received from subtraction unit 430. The turn-on current control is thereby achieved. Feedback control executed by controller 440 will be described later in detail.

Figure 6:
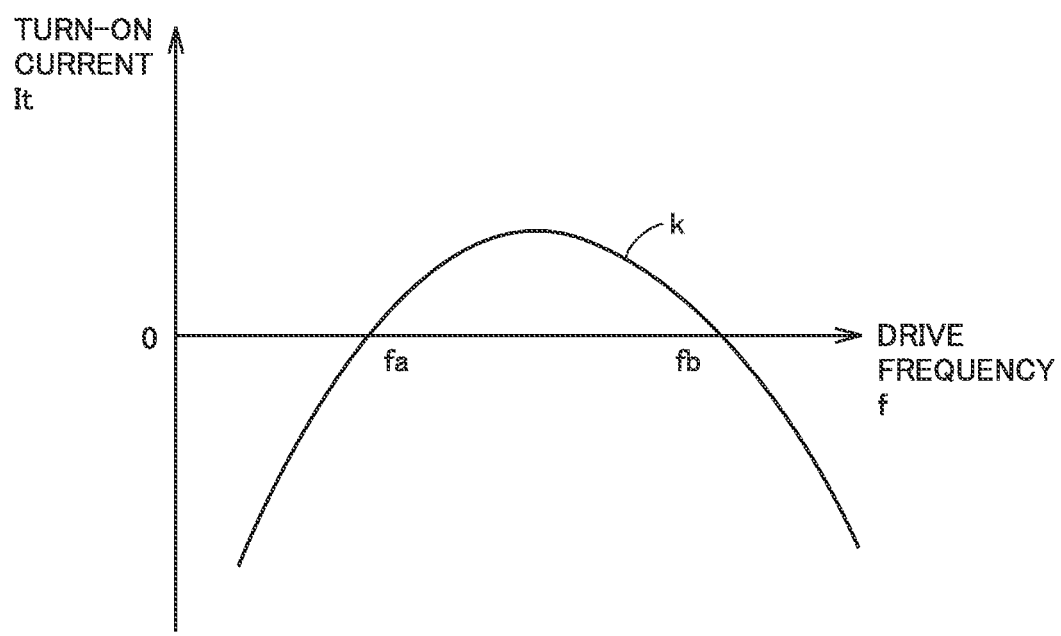
FIG. 6 illustrates the relation between a turn-on current and a drive frequency of the inverter with transmission power being constant.

FIG. 6 illustrates the relation between turn-on current It and drive frequency f of inverter 220 with transmission power Ps being constant. In FIG. 6, the horizontal axis indicates drive frequency f of inverter 220, and the vertical axis indicates turn-on current It. Referring to FIG. 6, a line k indicates turn-on current It while drive frequency f of inverter 220 is varied with transmission power Ps being constant. As an example, in the case of controlling turn-on current It to 0, drive frequency f of inverter 220 at which turn-on current It is 0 is present at two points, fa and fb.

The transmission power control for adjusting duty d of output voltage Vo of inverter 220 and the turn-on current control for adjusting drive frequency f of inverter 220 interfere with each other. Therefore, it may not be possible to control turn-on current It to target value Itr by the turn-on current control, depending on duty d adjusted by the transmission power control.

Figure 7A:
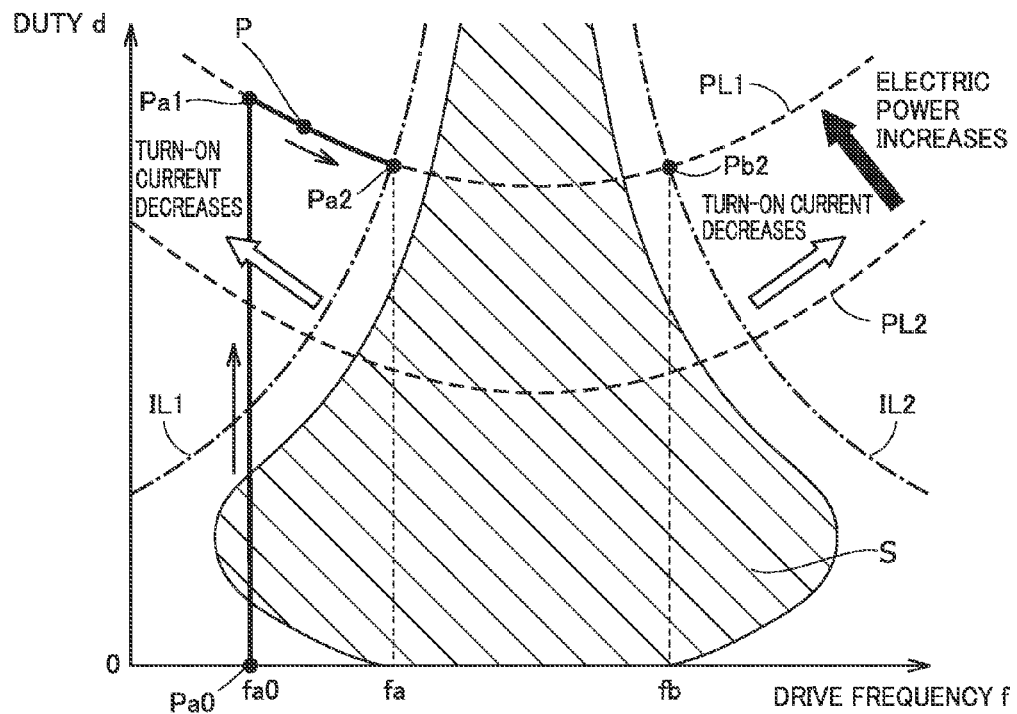
FIGS. 7A and 7B each illustrate an example of contour lines of transmission power and a turn-on current.
Figure 7B:
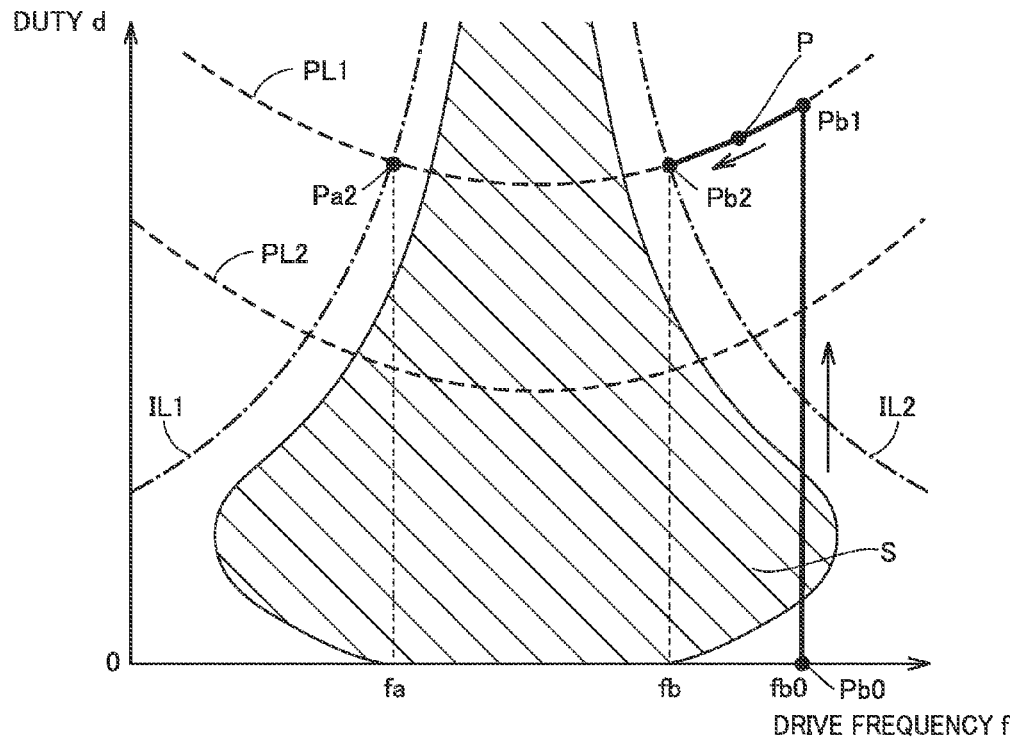

FIGS. 7A and 7B each illustrate an example of contour lines of transmission power Ps and turn-on current It. Referring to FIGS. 7A and 7B, the horizontal axis indicates drive frequency f of inverter 220, and the vertical axis indicates duty d of output voltage Vo of inverter 220.

FIG. 8 is an explanatory time chart of the transmission power control and the turn-on current control. In FIG. 8, the horizontal axis indicates the elapsed time. The vertical axis indicates transmission power Ps, turn-on current It, duty d, and drive frequency f in descending order.

Referring to FIGS. 7A and 7B, a shaded area S is an area where a recovery current is produced in inverter 220. That is, at an operating point of inverter 220 included in area S, turn-on current It becomes larger than 0, and a recovery current is produced in inverter 220. Hereinafter, this area S will also be called a "forbidden band S".

Each of lines PL1 and PL2 indicated by the dotted lines represents the contour line of transmission power Ps. The transmission power indicated by line PL1 is larger than the transmission power indicated by line PL2. As seen from the drawing, duty d that achieves certain transmission power indicates frequency dependence.

Each of lines IL1 and IL2 indicated by the alternate long and short dash lines represents the contour line on which turn-on current It becomes a predetermined value of less than or equal to 0. Contour lines on which turn-on current It is 0 are shown here as an example. The contour lines on which turn-on current It is 0 are present one each in an area on the lower frequency side and an area on the higher frequency side of forbidden band S. In the area on the lower frequency side where line IL1 is present, turn-on current It decreases (increases in the negative direction) as duty d increases and drive frequency f decreases. On the other hand, in the area on the higher frequency side where line IL2 is present, turn-on current It decreases as duty d increases and drive frequency f increases. The boundary of forbidden band S in FIGS. 7A and 7B is not a line on which the turn-on current is 0. That is, turn-on current It of a small positive value is allowed.

In the case of controlling turn-on current It to 0 while achieving transmission power PL1, for example, either one of an operating point Pa2 (an intersection of lines PL1 and IL1) and an operating point Pb2 (an intersection of lines PL1 and IL2) can be selected as a target operating point (initial operating point) of inverter 220.

FIG. 7A shows the case where operating point Pa2 is selected as the target operating point of inverter 220. Referring to FIGS. 7A and 8, when the startup processing of inverter 220 is executed, operating point P of inverter 220 transitions from Pa0 to Pa2 via Pa1, as indicated by the bold line.

In more detail, first, when operating point P transitions from Pa0 to Pa1, duty d is adjusted with drive frequency f being constant at a startup frequency fa0 (see the period from time t10 to time t11 in FIG. 8). In this case, since operating point P will pass through forbidden band S in the example shown in FIG. 7A, it is desirable to cause operating point P to promptly pass through forbidden band S by setting adjustment amount Δd of duty d at a large value or setting the gain of the transmission power control (gain of the feedback control for adjusting duty d) at a large value. Subsequently, when operating point P transitions from Pa1 to Pa2, turn-on current It is adjusted with transmission power Ps being constant on PL1 (see the period from time t11 to time t12 in FIG. 8).

On the other hand, FIG. 7B shows the case where operating point Pb2 is selected as the target operating point of inverter 220. Referring to FIG. 7B, when the startup processing of inverter 220 is executed, operating point P of inverter 220 transitions from Pb0 to Pb2 via Pb1, as indicated by the bold line. The control executed in this case is equivalent to that described with reference to FIG. 7A, and detailed description thereof will not be repeated. Startup frequencies fa0 and fb0 correspond to "first and second frequencies" according to the present invention, respectively.

In FIG. 7A, the time when inverter 220 is started up refers to a period during which operating point P reaches Pa1 from Pa0. In FIG. 7B, the time when inverter 220 is started up refers to a period during which operating point P reaches Pb1 from Pb0. That is, the time when inverter 220 is started up refers to a period (or part of a period) during which duty d of inverter 220 increases until transmission power Ps reaches target power Psr. Although the configurations for increasing duty d with drive frequency f being constant have been described with reference to FIGS. 7A and 7B by way of example, it is not indispensable to fix drive frequency f.

Here, in order to suppress the recovery current produced in inverter 220, it is desirable to execute the transmission power control and the turn-on current control such that operating point P of inverter 220 is not included in forbidden band S; however, a situation in which operating point P is included in forbidden band S may occur. Although the reason that the above-described situation occurs will be described below using the control shown in FIG. 7A as an example, the same applies to the control shown in FIG. 7B.

Figure 9:
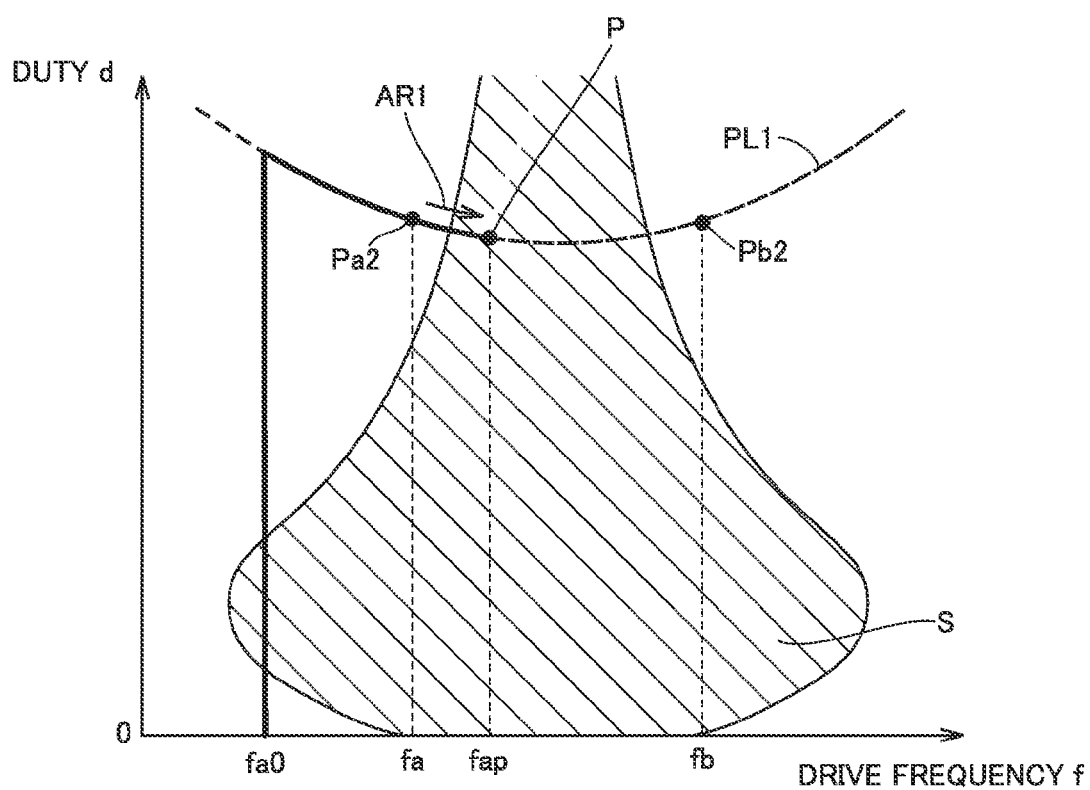
FIG. 9 is an explanatory drawing of a first situation in which an operating point of the inverter is included in a forbidden band.

FIG. 9 is an explanatory drawing of a first situation in which operating point P of inverter 220 is included in forbidden band S. Referring to FIG. 9, generally, in feedback control, a controlled value (a value to be controlled) may exceed (overshoot) a target value or may fluctuate (hunt) around the target value. In the turn-on current control according to the present embodiment, when adjustment amount Δf of drive frequency f is set at a relatively large value, for example, drive frequency f is likely to overshoot or hunt. As a result, as indicated by an arrow AR1, operating point P may pass through Pa2 to enter forbidden band S.

FIG. 10 is an explanatory drawing of a second situation in which operating point P of inverter 220 is included in forbidden band S. Referring to FIG. 10, in the case where power reception device 20 is mounted on a vehicle, the distance (hereinafter also referred to as a "gap") between power transmission device 10 and power reception device 20 will change when the vehicle height changes with loading or unloading during power transmission from power transmission device 10 to power reception device 20. Then, a coupling coefficient k between coil 242 of power transmission unit 240 and coil 312 of power reception unit 310 (see FIG. 2) may change. As a result, forbidden band S may change in shape to cause operating point P to be included in forbidden band S.

When the situation in which operating point P of inverter 220 is included in forbidden band S occurs in this way, it is desirable to execute the turn-on current control such that operating point P promptly exits forbidden band S. In the examples described with reference to FIGS. 9 and 10, it is required to select either one of the control for increasing drive frequency f such that operating point P traverses forbidden band S (i.e., controlling drive frequency f in the direction away from startup frequency fa0) and the control for decreasing drive frequency f such that operating point P returns (i.e., controlling drive frequency f in the direction toward startup frequency fa0).

It is also possible to determine which of the above-described two types of controls can cause operating point P to exit forbidden band S more promptly, based on the relative relation between operating point P of inverter 200 and the shape of forbidden band S. When forbidden band S changes in shape, for example (see FIG. 10), it is possible to obtain the changed shape of forbidden band S and to determine the direction in which operating point P transitions depending on the obtained result. However, since it requires time to obtain the shape of forbidden band S, a recovery current will flow in the meantime.

Therefore, when operating point P is included in forbidden band S, the present embodiment adopts the configuration of executing the turn-on current control such that operating point P returns. That is, drive frequency f is adjusted in the direction toward the startup frequency (in the examples shown in FIGS. 9 and 10, startup frequency fa0) during startup of inverter 220.

Figure 11A:
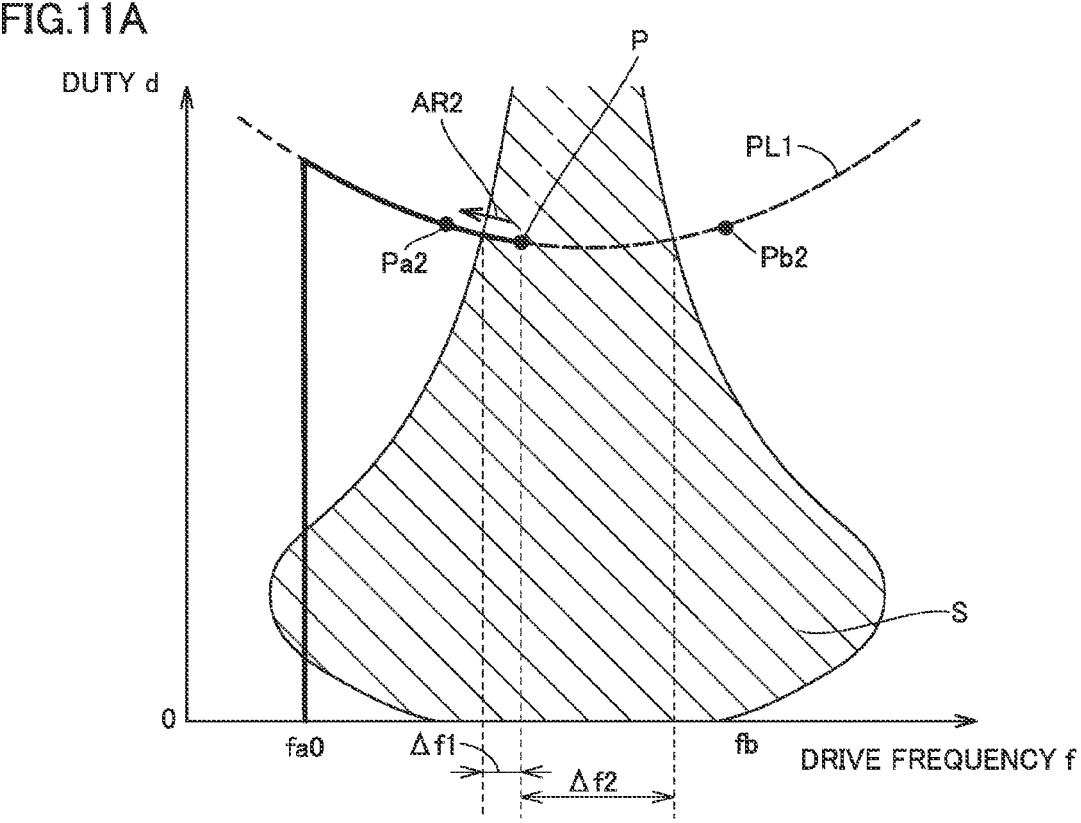
FIGS. 11A and 11B are explanatory drawings of turn-on current control executed when an operating point is included in the forbidden band in the present embodiment.
Figure 11B:
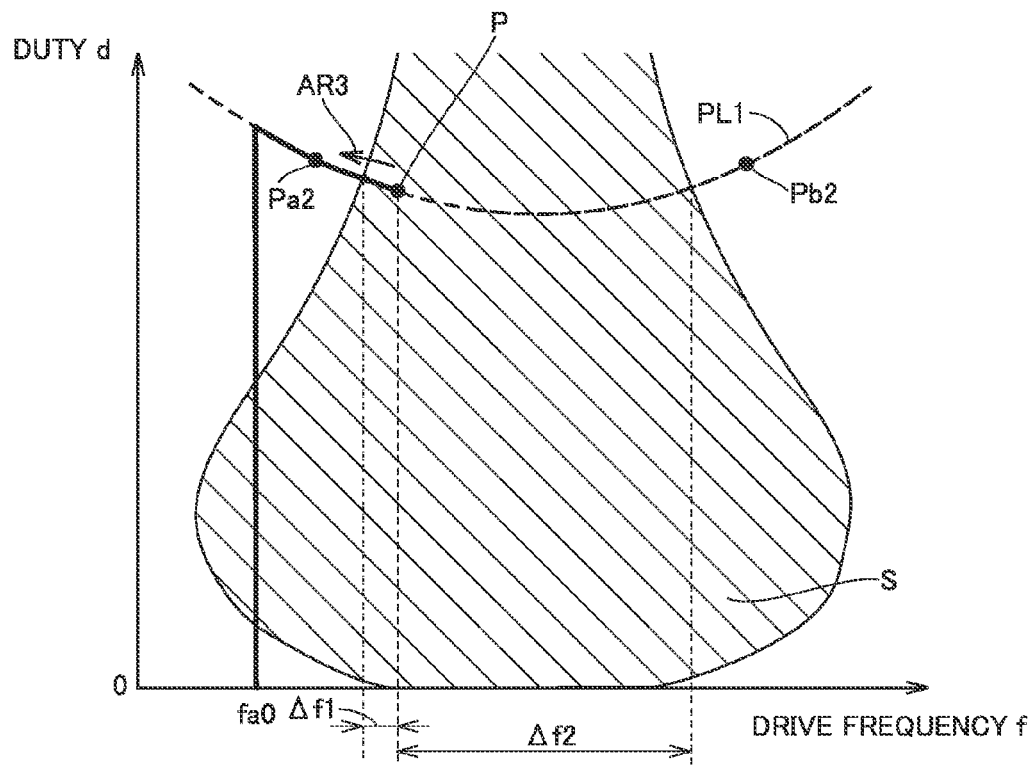

FIGS. 11A and 11B are explanatory drawings of the turn-on current control executed when operating point P is included in forbidden band S in the present embodiment. FIG. 11A corresponds to the situation described with reference to FIG. 9, and FIG. 11B corresponds to the situation described with reference to FIG. 10.

Referring to FIGS. 11A and 11B, if turn-on current It of more than or equal to a predetermined value (e.g., 0) is detected (i.e., if it is detected that operating point P is included in forbidden band S), power supply ECU 250 executes the turn-on current control such that drive frequency f of inverter 220 decreases while executing the transmission power control such that transmission power Ps is maintained on PL1 (see arrows AR2 and AR3).

The control executed by power supply ECU 250 will be described more specifically. Referring back to FIG. 5, if the calculated value obtained by subtraction unit 430 (the value obtained by subtracting turn-on current It (detected value) from target value Itr of the turn-on current) is approximately 0, controller 440 maintains drive frequency f at that time.

If the calculated value is a positive value (where turn-on current It is smaller than target value Itr), controller 440 increases drive frequency f by predetermined adjustment amount Δf. Accordingly, in the examples shown in FIGS. 9 and 10, drive frequency f is adjusted in the direction away from startup frequency fa0.

On the other hand, if the calculated value is a negative value (where turn-on current It is larger than target value Itr), controller 440 decreases drive frequency f by predetermined adjustment amount Δf. Accordingly, in the examples shown in FIGS. 9 and 10, drive frequency f is adjusted in the direction toward startup frequency fa0.

In this way, if turn-on current It is larger than target value Itr, drive frequency f is adjusted in the direction toward startup frequency fa0. Turn-on current It decreases as drive frequency f approaches startup frequency fa0. When operating point P is no longer included in forbidden band S, turn-on current It falls below the above-described predetermined value, so that the recovery current is suppressed. The reason for adopting such control will be described below.

First, a case in which drive frequency f of inverter 220 overshoots, for example, following a change in target power, and operating point P enters forbidden band S will be described. Referring to FIG. 11A, it is generally possible to detect that turn-on current It is larger than a predetermined value (e.g., 0) before operating point P deeply enters forbidden band S. Thus, comparing a difference Δf1 between drive frequency f when it is detected that turn-on current It is larger than the predetermined value and the boundary frequency on the lower frequency side of forbidden band S with a difference Δf2 between drive frequency f and the boundary frequency on the higher frequency side of forbidden band S, it is likely that difference Δf1 is smaller than difference Δf2. Therefore, bringing drive frequency f closer to startup frequency fa0 is more likely to cause operating point P to promptly exit forbidden band S than bringing drive frequency f away from startup frequency fa0.

Next, a case in which a change in shape of forbidden band S causes operating point P to be included in forbidden band S will be described. Referring to FIG. 11B, forbidden band S in many cases continuously changes in shape as the distance (gap) between power transmission device 10 and power reception device 20 changes with loading or the like.

In more detail, the shape of forbidden band S is defined by the magnitude of turn-on current It. As shown in FIG. 4, turn-on current It is settled in accordance with the phase difference between output current Io and output voltage Vo of inverter 220. This phase difference continuously changes in accordance with a mutual inductance M between power transmission device 10 and power reception device 20. Mutual inductance M is proportional to coupling coefficient k between coil 242 of power transmission unit 240 and coil 312 of power reception unit 310 (see FIG. 2). In general, coupling coefficient k continuously decreases as the gap is widened. From the foregoing, as long as the gap continuously changes, forbidden band S continuously changes in shape. Therefore, when it is detected that turn-on current It is larger than the predetermined value, it is likely that forbidden band S has not been changed in shape largely, and that difference Δf1 is smaller than difference Δf2. Therefore, bringing drive frequency f closer to startup frequency fa0 is more likely to cause operating point P to promptly exit forbidden band S than bringing drive frequency f away from startup frequency fa0.

In this way, in either of the situations described with reference to FIGS. 9 and 10, adjusting drive frequency f in the direction toward startup frequency fa0 is more likely to cause operating point P to promptly exit forbidden band S than adjusting drive frequency f in the direction away from startup frequency fa0. Therefore, it is more likely that the recovery current can be reduced promptly.

Furthermore, when operating point P is included in forbidden band S, it is preferable to set adjustment amount Δf of drive frequency f in the turn-on current control at a larger value than when operating point P is not included in forbidden band S. Since the time required for operating point P to exit forbidden band S is thereby shortened, the recovery current can be reduced further.

Although not shown, as described with reference to FIG. 7B, when fb0 is selected as the startup frequency, the direction in which drive frequency f is adjusted is opposite to that described with reference to FIG. 5. That is, if turn-on current It of more than or equal to the predetermined value is detected, power supply ECU 250 executes the turn-on current control such that drive frequency f increases. Drive frequency f is thereby adjusted in the direction toward startup frequency fb0.

Figure 12:
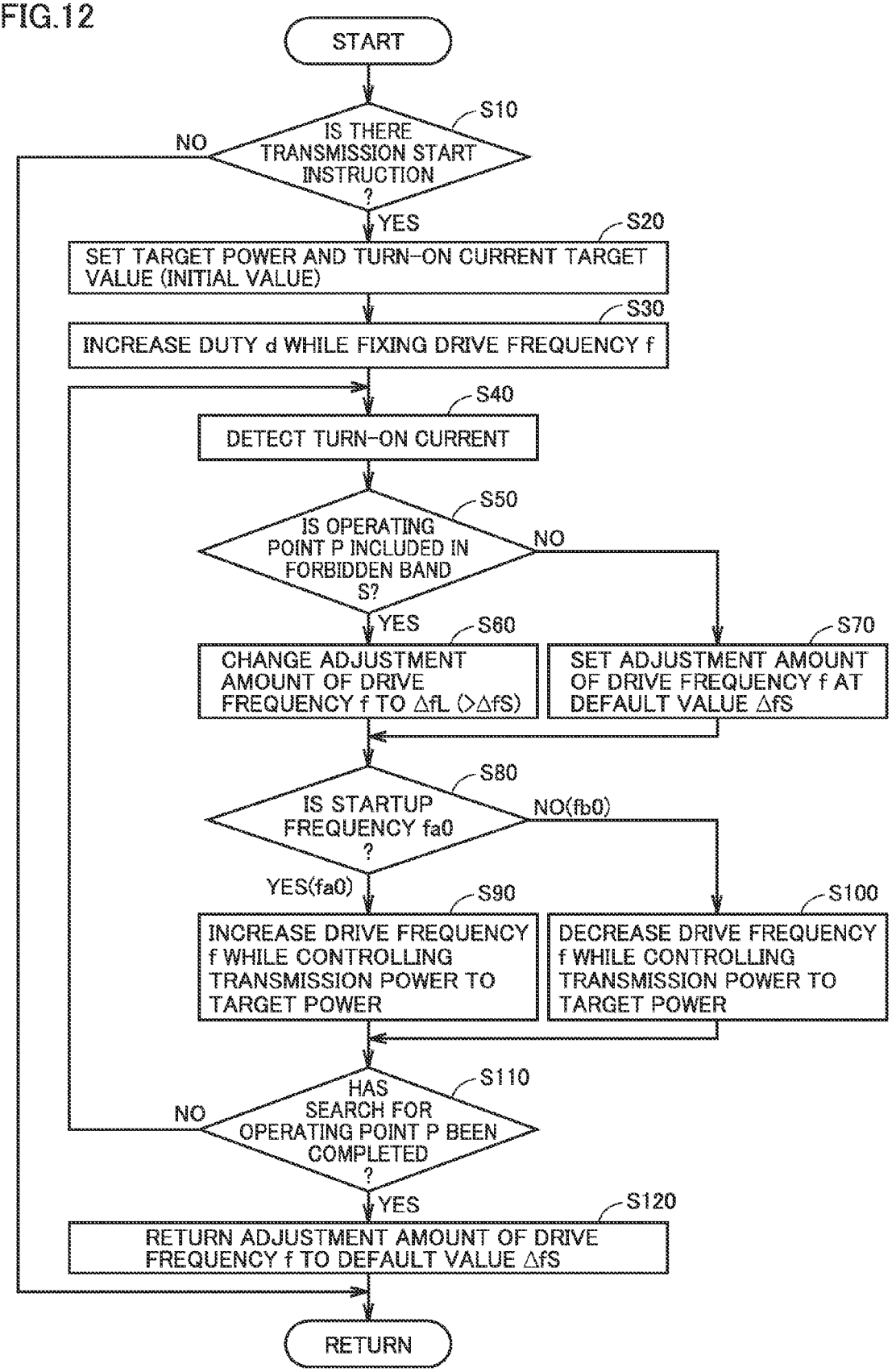
FIG. 12 is an explanatory flowchart of transmission power control and turn-on current control executed by the power supply ECU according to the present embodiment.

FIG. 12 is an explanatory flowchart of the turn-on current control executed by power supply ECU 250 according to the present embodiment. Each step (hereinafter abbreviated to S) shown in this flowchart is invoked for execution from a main routine at predetermined intervals or when predetermined conditions are met. The configuration in which the startup frequency of inverter 220 is set on the lower frequency side of forbidden band S as shown in FIG. 7A will be described below by way of example.

Referring to FIGS. 1, 5 and 12, power supply ECU 250 determines in step S10 whether or not there is a power transmission start instruction sent from power transmission device 10 to power reception device 20. This power transmission start instruction may be based on a user instruction made in power transmission device 10 or power reception device 20, or may be produced following the arrival of a charging start time indicated by a timer or the like. When there is no power transmission start instruction (NO in step S10), power supply ECU 250 returns the process to the main routine without executing a series of subsequent operations.

When a determination is made that there is a power transmission start instruction in step S10 (YES in step S10), power supply ECU 250 sets target power Psr for transmission power Ps and target value Itr (initial value) for turn-on current It (S20). While target power Psr is produced based on the power reception state of power reception device 20 as described above, it is set at a predetermined initial value at this time point when power transmission has not been started. As the initial value of turn-on current target value Itr, 0 is selected, for example.

In S30, power supply ECU 250 starts execution of the transmission power control and the turn-on current control. Specifically, power supply ECU 250 increases duty d while fixing drive frequency f at the startup frequency. Operating point P thereby transitions from Pa0 to Pa1 (see FIG. 7A).

When operating point P reaches operating point Pa1, power supply ECU 250 obtains a detected value of turn-on current It (S40). Furthermore, power supply ECU 250 determines whether or not the detected value of turn-on current It is larger than a predetermined value (e.g., 0), that is, whether or not operating point P is included in forbidden band S (S50).

If operating point P is not included in forbidden band S (NO in S50), power supply ECU 250 uses ΔfS, which is a default value (normal value), as adjustment amount Δf of drive frequency f of inverter 220 in the turn-on current control (S70).

On the other hand, if operating point P is included in forbidden band S (YES in S50), power supply ECU 250 changes adjustment amount Δf of drive frequency f from default value ΔfS to ΔfL which is larger than ΔfS (S60). This increases the adjustment speed of drive frequency f (the adjustment amount of drive frequency f per unit time) for operating point P to exit forbidden band S in an operating point search procedure of S80 to S100 below.

In S80, power supply ECU 250 determines whether or not the startup frequency of inverter 220 is a value (fa0) on the lower frequency side of forbidden band S. When the startup frequency is fa0 (first frequency) (YES in S80), power supply ECU 250 advances the process to S90. Since the example in which the startup frequency is set at fa0 is described here, the following processing of S90 is executed.

In S90, power supply ECU 250 executes a search for operating point P of inverter 220 by basically increasing drive frequency f (i.e., adjusting it to be more than or equal to fa0), while controlling transmission power Ps to target power Psr. More specifically, controller 420 improves the followability of transmission power Ps to target power Psr by setting the gain (adjustment amount Δd of duty d) of controller 420 at a value larger than in the processing of S30, for example. Furthermore, if turn-on current It is smaller than target value Itr, controller 440 increases drive frequency f by adjustment amount Δf. On the other hand, if turn-on current It is larger than target value Itr, controller 440 decreases drive frequency f by adjustment amount Δf.

If the startup frequency is fb0 (second frequency) (NO in S80), power supply ECU 250 advances the process to S100. In S100, power supply ECU 250 executes a search for operating point P of inverter 220 by basically decreasing drive frequency f (i.e., adjusting it to be less than or equal to fb0), while controlling transmission power Ps to target power Psr. Since this specific control is equivalent to the control in S90, description thereof will not be repeated.

In S110, power supply ECU 250 determines whether or not the search for operating point P of inverter 220 has been completed. This completion of search may be determined from various viewpoints. For example, it may be determined that the search for operating point P has been completed when the local minimum of a current I1 flowing in power transmission unit 240 is found out, when the decreasing rate of current I1 falls below a predetermined value, or when turn-on current target value Itr reaches a predetermined lower limit.

When a determination is made that the search for operating point P has not been completed (NO in S110), power supply ECU 250 returns the process to S50. On the other hand, when a determination is made that the search for operating point P has been completed (YES in S110), power supply ECU 250 returns adjustment amount Δf of drive frequency Δf changed in S70 to default value ΔfS (S120). Then, the process is returned to the main routine.

As described above, adjusting drive frequency f in the direction toward the startup frequency is more likely to cause operating point P to promptly exit forbidden band S than adjusting drive frequency f in the direction away from the startup frequency. Therefore, according to the present embodiment, when it is detected that turn-on current It is larger than a predetermined value (target value Itr), drive frequency f is adjusted in the direction toward the startup frequency. The recovery current can thereby be reduced more promptly.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A contactless power transmission device, comprising:
a power transmission unit configured to transmit electric power to a power reception device in a contactless manner;
a voltage-source inverter configured to supply transmission power in accordance with a drive frequency to the power transmission unit; and
a control unit configured to control the inverter,
the control unit executing turn-on current control for controlling a turn-on current by adjusting the drive frequency, the turn-on current indicating an output current of the inverter at a rising of an output voltage of the inverter, in the turn-on current control,
when a startup frequency indicating the drive frequency at a startup of the inverter is a first frequency, the control unit adjusting the drive frequency to be more than or equal to the first frequency, and
when the startup frequency is a second frequency which is higher than the first frequency, the control unit adjusting the drive frequency to be less than or equal to the second frequency,
when the turn-on current is larger than a predetermined limit value, the control unit adjusting the drive frequency in a direction toward the startup frequency.

2. The contactless power transmission device according to claim 1, wherein when the drive frequency is more than or equal to the first frequency and when the turn-on current is larger than the limit value, the control unit decreases the drive frequency, and
when the drive frequency is less than or equal to the second frequency and when the turn-on current is larger than the limit value, the control unit increases the drive frequency.

3. The contactless power transmission device according to claim 1, wherein an adjustment amount of the drive frequency adjusted by the control unit when the turn-on current is larger than the limit value is larger than an adjustment amount of the drive frequency adjusted by the control unit when the turn-on current is smaller than the limit value.

4. A power transfer system, comprising:
a power transmission device; and
a power reception device,
the power transmission device including
a power transmission unit configured to transmit electric power to the power reception device in a contactless manner,
a voltage-source inverter configured to supply transmission power in accordance with a drive frequency to the power transmission unit, and
a control unit configured to control the inverter,
the control unit executing turn-on current control for controlling a turn-on current by adjusting the drive frequency, the turn-on current indicating an output current of the inverter at a rising of an output voltage of the inverter,
in the turn-on current control,
when a startup frequency indicating the drive frequency at a startup of the inverter is a first frequency, the control unit adjusting the drive frequency to be more than or equal to the first frequency, and
when the startup frequency is a second frequency which is higher than the first frequency, the control unit adjusting the drive frequency to be less than or equal to the second frequency,
when the turn-on current is larger than a predetermined limit value, the control unit adjusting the drive frequency in a direction toward the startup frequency.

5. The power transfer system according to claim 4, wherein when the drive frequency is more than or equal to the first frequency and when the turn-on current is larger than the limit value, the control unit decreases the drive frequency, and
when the drive frequency is less than or equal to the second frequency and when the turn-on current is larger than the limit value, the control unit increases the drive frequency.

6. The power transfer system according to claim 4, wherein an adjustment amount of the drive frequency adjusted by the control unit when the turn-on current is larger than the limit value is larger than an adjustment amount of the drive frequency adjusted by the control unit when the turn-on current is smaller than the limit value.

* * * * *